US012679156B2

(12) United States Patent (10) Patent No.: US 12,679,156 B2
Liu (45) Date of Patent: Jul. 14, 2026

(54) LEAF SPRING STRUCTURE AND SUSPENSION STRUCTURE

(71) Applicant: CONTEMPORARY AMPEREX TECHNOLOGY (HONG KONG) LIMITED, Hong Kong (CN)

(72) Inventor: Shuai Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 463 days.

(21) Appl. No.: 18/332,443

(22) Filed: Jun. 9, 2023

(65) Prior Publication Data

US 2023/0331053 A1 Oct. 19, 2023

Related U.S. Application Data

(63) Continuation of application No. PCT/CN2022/105265, filed on Jul. 12, 2022.

(30) Foreign Application Priority Data

Sep. 29, 2021 (CN) .......................... 202122384614.2

(51) Int. Cl.
B60G 11/12 (2006.01)

(52) U.S. Cl.
CPC .................................... B60G 11/12 (2013.01)

(58) Field of Classification Search
CPC ......... B60G 11/08; B60G 11/10; B60G 11/12; B60G 21/05; B60G 2200/14; B60G 2202/114; B60G 2204/121
See application file for complete search history.

(56) References Cited

U.S. PATENT DOCUMENTS 3,841,655 A * 10/1974 Schaeff .................. B60G 11/12
267/269
4,887,802 A * 12/1989 Wilcox .................. B60G 11/12
267/148
(Continued)

FOREIGN PATENT DOCUMENTS

CN 201046656 Y * 4/2008
CN 102416836 A * 4/2012
(Continued)

OTHER PUBLICATIONS

The World Intellectual Property Organization (WIPO) International Search Report and Written Opinion for PCT/CN2022/105265 Sep. 21, 2022 15 Pages (including translation).
(Continued)

*Primary Examiner* — Vishal R Sahni
(74) *Attorney, Agent, or Firm* — Anova Law Group, PLLC

(57) ABSTRACT

A leaf spring structure includes at least two leaf springs, a leaf spring connecting component, two first lifting ears, and two second lifting ears. The at least two leaf springs overlap in a vertical direction, and the at least two leaf springs decrease in length gradually from bottom up. The at least two leaf springs include a first leaf spring and a second leaf spring. The first leaf spring is longer than the second leaf spring. The leaf spring connecting component is configured to fixedly connect body portions of the at least two leaf springs in a length direction. The two first lifting ears are respectively disposed at two first free ends of the first leaf spring in the length direction, and the two second lifting ears are respectively disposed at two second free ends of the second leaf spring in the length direction.

9 Claims, 1 Drawing Sheet

(56)    References Cited

U.S. PATENT DOCUMENTS

| | | | | |
|---|---|---|---|---|
| 5,228,665 A * | 7/1993 | Berghus | .................. | F16F 1/182 |
| | | | | 267/260 |
| 5,636,857 A * | 6/1997 | Tandy, Jr. | .............. | B60G 21/05 |
| | | | | 267/31 |
| 2018/0126815 A1 * | 5/2018 | Berlingieri | ............ | B60G 11/10 |

FOREIGN PATENT DOCUMENTS

| | | | | | |
|---|---|---|---|---|---|
| CN | 207657538 U | | 7/2018 | | |
| CN | 109070671 A | * | 12/2018 | .............. | B60G 3/10 |
| CN | 107110265 B | * | 6/2020 | ............ | B21D 53/00 |
| CN | 216184315 U | | 4/2022 | | |
| CN | 216268536 U | | 4/2022 | | |
| DE | 10324552 A1 | * | 12/2003 | ............ | B60G 11/08 |
| FR | 545515 A | | 10/1922 | | |
| GB | 174066 A | | 12/1922 | | |
| JP | 2002526729 A | * | 8/2002 | ............ | F16F 1/3686 |
| KR | 101783265 B1 | * | 10/2017 | ............ | B60G 11/04 |
| WO | WO-0169103 A1 | * | 9/2001 | ............ | B60G 11/02 |

OTHER PUBLICATIONS

State Intellectual Property Office of China Notice of Grant of Utility Model Patent Rights for Application No. 202122384614.2, Mar. 15, 2022 2 pages (including translation).

* cited by examiner

1

2

LEAF SPRING STRUCTURE AND SUSPENSION STRUCTURE

CROSS-REFERENCE TO RELATED APPLICATIONS

This application is a continuation of International Application No. PCT/CN2022/105265, filed on Jul. 12, 2022, which claims priority to Chinese patent application (No. 202122384614.2), filed on Sep. 29, 2021 and entitled "LEAF SPRING STRUCTURE AND SUSPENSION STRUCTURE", which are incorporated herein by reference in their entirety.

TECHNICAL FIELD

This application relates to the field of vehicle technologies, and in particular, to a leaf spring structure and a suspension structure.

BACKGROUND

As a traditional elastic element and guide means in the vehicle suspension system, the leaf spring is widely used due to advantages such as reliability, low costs, and short manufacturing process. However, in a traditional leaf spring structure, too many components are connected to the leaf spring structure, wasting the installation space of the vehicle. In addition, the shock absorber is not directly connected to the leaf spring structure but arranged on the steering knuckle or other components, generating some bias torque, which is not conducive to the steering of wheels and the force bearing by the shock absorber when the wheels bounce, thus leading to the poor comfort and stability of the vehicle. Therefore, regarding the leaf spring structure, how to improve the utilization of the vehicle installation space and the stability of the vehicle has become an urgent problem to resolve.

SUMMARY

This application provides a leaf spring structure able to improve the utilization of the vehicle installation space and provide installation space for the steering knuckle and shock absorber, thereby improving the stability of the vehicle.

A first aspect of this application provides a leaf spring structure including at least two leaf springs, a leaf spring connecting component, two first lifting ears, and two second lifting ears. The at least two leaf springs overlap in a vertical direction, and the at least two leaf springs decrease in length gradually from the bottom upwards. The at least two leaf springs include a first leaf spring and a second leaf spring, the first leaf spring being longer than the second leaf spring. The leaf spring connecting component is configured to fixedly connect body portions of the at least two leaf springs in a length direction. The two first lifting ears are respectively disposed at two first free ends of the first leaf spring in the length direction, and the two second lifting ears are respectively disposed at two second free ends of the second leaf spring in the length direction. The leaf spring structure including at least two leaf springs not only enhance the connection strength and durability of the leaf spring structure but also can improve the fatigue life of the leaf spring structure. In addition, the lifting ears being designed at each two free ends of the first leaf spring and the second leaf spring can provide installation space for the steering knuckle and the shock absorber, thus improving the utilization of the vehicle installation space.

In some embodiments, the at least two leaf springs have equal width such that the leaf springs can overlap in exact alignment. This allows the leaf spring connecting component to fixedly connect body portions of all leaf springs in the length direction, thus making the leaf spring structure firmer.

In some embodiments, the first leaf spring is disposed at a lowest part of the leaf spring structure, facilitating the arrangement of two first lifting ears at two first free ends of the first leaf spring in the length direction and allowing the first leaf spring to support from the lowest part other leaf springs and other components.

In some embodiments, the second leaf spring is located above the first leaf spring. Because the first leaf spring is longer than the second leaf spring, the second leaf spring being disposed above the first leaf spring makes it easy to arrange two second lifting ears at two second free ends of the second leaf spring.

In some embodiments, the second leaf spring and the first leaf spring are adjacent to or spaced apart from each other. In this way, the distance between the two first free ends and two second free ends in the vertical direction can be adjusted flexibly, and thus the requirements for installation space for components such as a steering knuckle and a shock absorber can be met more flexibly.

In some embodiments, the first lifting ear and the first leaf spring are integrally formed; and/or the second lifting ear and the second leaf spring are integrally formed. The lifting ear and the leaf spring being integrally formed can simplify the crafting process and reduce the components, thus reducing the manufacturing costs.

In some embodiments, the first lifting ear and the second lifting ear are circularly or elliptically curved. The circularly or elliptically curved lifting ear does not limit the freedom degree of the two ends of the leaf spring, thus allowing for the formation of free ends connecting other components. The free ends are connected to the steering knuckle and shock absorber through hinging or other rotatable manners.

In some embodiments, the two second lifting ears are located between the first lifting ears in the length direction of the leaf springs, staggering the first lifting ears and the second lifting ears in position. This avoids mutual interference between connecting components during mounting and facilitates the mounting of components such as the steering knuckle and shock absorber.

A second aspect of this application provides a suspension structure including the leaf spring structure provided by the first aspect of this application. The suspension structure not only has high strength, good durability, and longer fatigue life but also facilitates full use of the installation space of the vehicle. The suspension structure of this application can also improve the comfort and stability of a vehicle when practically used in the vehicle.

In some embodiments, the suspension structure further includes a steering knuckle assembly and a shock absorber assembly. The first lifting ears are connected to the steering knuckle assembly, and the second lifting ears are connected to the shock absorber assembly. The connection of the steering knuckle assembly to the first lifting ears reduces the components connected to the steering knuckle, facilitating the steering of wheels. The connection of the shock absorber assembly to the second lifting ears makes the shock absorber assembly located in a bouncing center line of the wheels, such that the force experienced by the shock absorber can act directly on the bouncing center of the wheels, providing a more obvious shock absorbing effect when the wheels bounce. In addition, the shock absorber does not have to bear the bias torque any more and therefore has less wear, increasing the service life of the shock absorber.

In the leaf spring structure provided by the first aspect of this application, the leaf spring structure includes at least two leaf springs, a leaf spring connecting component, two first lifting ears, and two second lifting ears. The leaf spring structure with pairs of lifting ears not only can reduce the components connected but also can provide space required for installing the steering knuckle and the shock absorber, thereby improving the utilization of the vehicle installation space. In addition, the connection of the lifting ears to the steering knuckle and the shock absorber makes the wheels steer more easily during use. Furthermore, the shock absorber is disposed closer to the bouncing center of the wheels, providing a better shock absorbing effect when the wheels bounce and prolonging the service life of the shock absorber, thus making the vehicle more stable. Therefore, the leaf spring structure of this application can improve not only the utilization of the installation space but also the stability and comfort of the vehicle.

BRIEF DESCRIPTION OF DRAWINGS

To describe the technical solutions of the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts.

Figure 1:
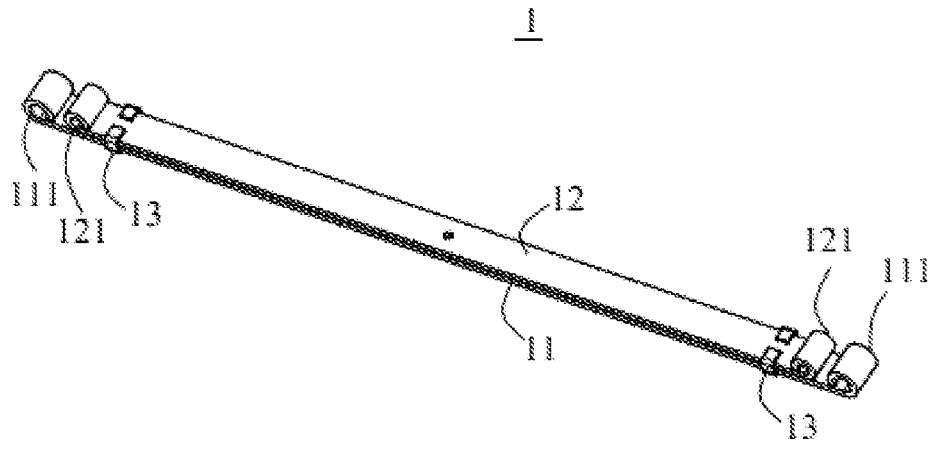
FIG. 1 is a schematic structural diagram of a leaf spring structure according to an embodiment of this application.

The accompanying drawings are not drawn to scale.

Reference signs: 1. leaf spring structure; 11. first leaf spring; 111. first lifting ear; 12. second leaf spring; 121. second lifting ear; and 13. leaf spring connecting component;

2. suspension structure; 21. shock absorber; 22. upper swing arm; and 23. steering knuckle.

DESCRIPTION OF EMBODIMENTS

The following further describes embodiments of this application in detail with reference to the accompanying drawings and examples. The following detailed description of embodiments and the accompanying drawings are intended to illustrate the principle of this application rather than to limit the scope of this application, which means this application is not limited to the embodiments as described.

In the descriptions of this application, it should be noted that, unless otherwise stated, "plurality of" means more than two (including two); and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations or be constructed and manipulated with specific orientations, and therefore shall not be construed as limitations on this application. In addition, the terms "first", "second", and "third"

are merely intended for a purpose of description, and shall not be understood as an indication or implication of relative importance. "Perpendicular" is not perpendicular in the strict sense but within an allowable range of error. "Parallel" means being parallel with an allowable range of error other than being strictly parallel.

In this specification, reference to "embodiment" means that specific features, structures, or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

The term "and/or" in this specification is only an associative relationship for describing associated objects, indicating that three relationships may be present. For example, A and/or B may indicate three cases: presence of only A; presence of both A and B; and presence of only B. In addition, the character "/" in this specification generally indicates an "or" relationship between contextually associated objects.

In the embodiments of this application, the same reference signs denote the same components. For brevity, in different embodiments, detailed descriptions of the same components are not repeated. It should be understood that, as shown in the accompanying drawings, sizes such as thickness, length, and width of various members and sizes such as thickness, length, and width of integrated devices in the embodiments of this application are merely for illustrative purposes and should not constitute any limitations on this application.

The orientation terms appearing in the following description all refer to the orientations as shown in the drawings, and do not limit the specific structure of the application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

At present, too many components are connected to a leaf spring structure, wasting the installation and arrangement space in the vehicle. In addition, the existing shock absorber is not directly connected to the leaf spring structure and the existing arrangement position of the shock absorber is not conducive to the steering of wheels and the transmission of forces when the wheels bounce, thus leading to the poor comfort and stability of the vehicle.

In view of this, this application provides a leaf spring structure, where a lifting ear is disposed at both free ends of the leaf spring structure. Through the design of a structure with lifting ears, the leaf spring structure can be directly connected to components such as the steering knuckle and shock absorber, reducing the components connected to the leaf spring structure, thereby improving the utilization of vehicle installation space. In addition, the shock absorber is located on the bouncing center line of the wheels, providing a more obvious shock absorbing effect, thereby improving the comfort and stability of the vehicle.

It should be noted that the leaf spring structure described in the embodiments of this application can be applied to suspension structures, vehicles, and the like. The vehicle may be a fossil fuel vehicle, a natural-gas vehicle, a new energy vehicle, a motorcycle, or the like. The new energy vehicle may be a battery electric vehicle, a hybrid electric vehicle, an extended-range electric vehicle, or the like. The embodiments of this application impose no special limitation on the foregoing vehicle.

Figure 2:
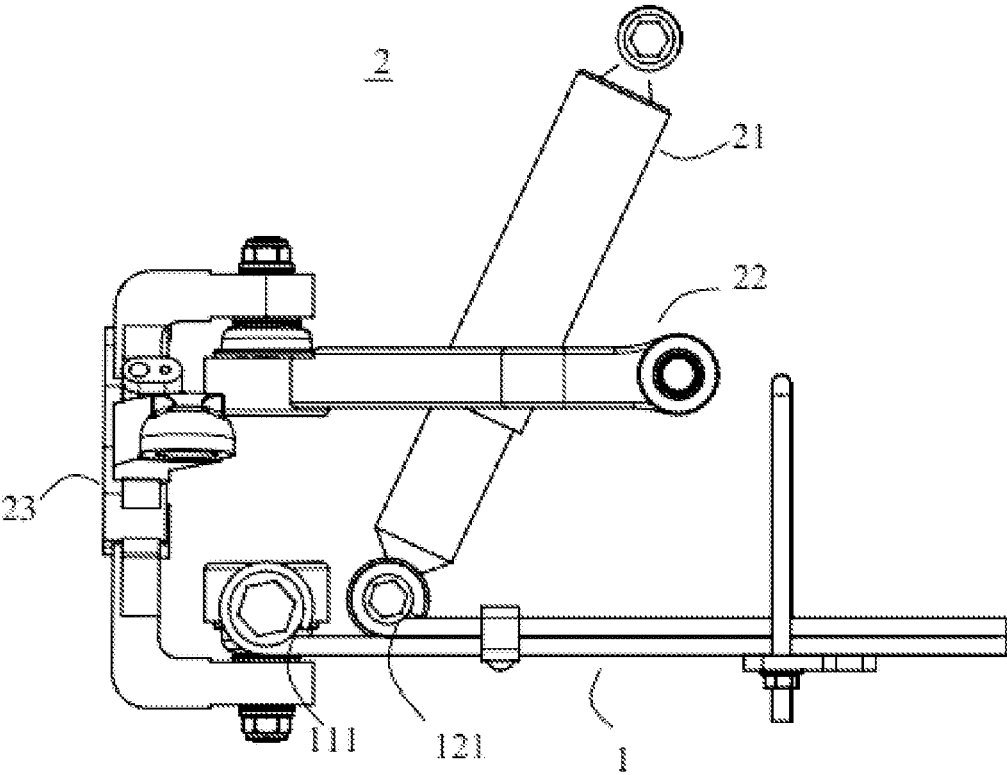
FIG. 2 is a schematic structural diagram of a suspension structure according to an embodiment of this application.

According to a first aspect of this application, referring to FIG. 1 and FIG. 2, an embodiment of this application discloses a leaf spring structure 1. The leaf spring structure 1 includes at least two leaf springs, a leaf spring connecting component 13, two first lifting ears 111, and two second lifting ears 121. The at least two leaf springs overlap in a vertical direction, and the at least two leaf springs decrease in length gradually from the bottom upwards. The at least two leaf springs include a first leaf spring 11 and a second leaf spring 12, the first leaf spring 11 being longer than the second leaf spring 12. The leaf spring connecting component 13 is configured to fixedly connect body portions of the at least two leaf springs in a length direction. The two first lifting ears 111 are respectively disposed at two first free ends of the first leaf spring 11 in the length direction. The two second lifting ears 121 are respectively disposed at two second free ends of the second leaf spring 12 in the length direction.

As a traditional elastic element and guide structure in the vehicle suspension system, the leaf spring can be used to transmit various forces and torques, with a frictional shock absorbing effect. The leaf spring is a group of approximately equally strong spring beams formed by a combination of unequally long alloy spring steel pieces. In order to improve the connection strength of the leaf spring structure 1, the leaf spring structure 1 shown in FIG. 1 includes at least two leaf springs which include the first leaf spring 11 and the second leaf spring 12. "At least two" means more than two (including two), and the quantity of leaf springs is not limited particularly in the embodiments of this application. In the leaf spring structure 1 in FIG. 1, the leaf springs decrease in length gradually from the bottom upwards, which, however, is not limited in embodiments of this application. Alternatively, the leaf springs may become longer gradually from the bottom upwards or overlap with unequal lengths. The leaf spring may be made of alloy steel or other materials. The leaf springs may be classified by shape into elliptical leaf spring, half-elliptical leaf spring, ¼ elliptical leaf spring, and sheet leaf spring. These four types of leaf springs are all combinational. The leaf spring structure has high buffering and shock absorbing performances relying on the friction between the leaves. The leaf spring shown in FIG. 1 is a sheet leaf spring but not limited thereto in embodiments of this application. The leaf spring may instead be of other types.

The leaf spring connecting component 13 is configured to fixedly connect body portions of the at least two leaf springs in the leaf spring structure 1. The connecting component is generally formed by a locking member and a limit member and may adopt a detachable connection such as bolting and snapping, a connection through welding or riveting, or an integral formation through stamping or the like. The leaf spring connecting component 13 adopts a detachable connection in most cases. The bolting connection may be implemented by a combination of a nut and a bolt and is a type of connection through which two or more parts or components are bolted together as a whole. Specifically, the component for bolting connection can fix body portions of all leaf springs in the leaf spring structure. The snapping connection may be implemented by a combination of a snap and a limit block or use of parts such as a snap spring or snap ring to limit the movement of the leaf spring.

The free ends are action ends whose freedom is not all limited on the leaf spring structure 1 and can be used to connect to the steering knuckle 23, the shock absorber 21, or other components. Considering the need of installation, the first leaf spring 11 and the second leaf spring 12 are each provided with two free ends. Two first free ends are provided at two ends of the first leaf spring 11, and two second free ends are provided at two ends of the second leaf spring 12. The free ends can bear concentrated load and pressure from parts including but not limited to lifting ears, shaft ears, and tail ears and can fit the connecting ends of the steering knuckle 23, shock absorber 21, or other components. The free ends and the leaf spring may be integrally informed or detachably connected, depending on the needs of the actual application scenario.

The lifting ear is a force-bearing element installed on the leaf spring structure 1 for connection and is also an important connecting part of the suspension structure 2. The leaf spring structure 1 includes two first lifting ears 111 and two second lifting ears 121. The two first lifting ears 111 are respectively disposed at the two first free ends of the first leaf spring 11, and the two second lifting ears 121 are respectively disposed at the two second free ends of the second leaf spring 12. The first lifting ear 111 and the second lifting ear 121 have good load-bearing capacity and stability as well as strong corrosion resistance and are not easily deformed. Preferably, the lifting ears and the leaf spring are made of the same or similar materials. The lifting ears and the leaf spring are integrally informed or detachably connected. Preferably, the first lifting ear 111 and the second lifting ear 121 are integrally formed with the leaf springs, which simplifies the manufacturing process of the leaf spring structure 1. The lifting ear may be circularly, elliptically, or squarely curved so as to fit the connecting component.

"Length direction" is a direction along the length of the leaf spring in respect of the leaf spring itself. In FIG. 1, the leaf spring structure 1 is provided with two first lifting ears 111 and two second lifting ears 121 in the length direction of the leaf spring. In addition, "vertical direction" is a direction perpendicular to a horizontal plane when the leaf spring structure 1 is parallel to the horizontal plane or a direction perpendicular to the length direction of the leaf spring structure 1. At least two leaf springs overlap in the vertical direction. "Overlap" means that the at least two leaf springs are stacked layer by layer. Preferably, in the case of overlapping in the vertical direction, the at least two leaf springs decrease in length gradually from the bottom upwards.

According to embodiments of this application, the leaf spring structure 1 including at least two leaf springs not only can enhance the connection strength and durability of the leaf spring structure 1 but also can improve the fatigue life of the leaf spring structure 1. In addition, designing lifting ears at two free ends of both the first leaf spring 11 and the second leaf spring 12 can make room for installation of the steering knuckle 23 and the shock absorber 21, thus improving the utilization of the vehicle installation space.

Referring to FIG. 1, according to an embodiment of this application, the at least two leaf springs have equal width. "Equal width" means that widths of the at least two leaf springs are equal. However, certainly, "equal width" does not mean absolute consistence in the strict sense but within an allowable range of error. This ensures that all the leaf springs can overlap in exact alignment. The first leaf spring 11 and the second leaf spring 12 have equal width.

According to this embodiment of this application, the at least two leaf springs have equal width such that the leaf springs can overlap in exact alignment. This allows the leaf spring connecting component 13 to fixedly connect body portions of all leaf springs in the length direction, thus making the leaf spring structure 1 firmer.

Referring to FIG. 1, according to an embodiment of this application, the first leaf spring 11 is disposed at a lowest part of the leaf spring structure 1.

"Lowest part" is the lowest part of all leaf springs overlapping in the vertical direction in respect of the leaf spring structure 1. It may be understood that the first leaf spring 11 is the lowest of all the leaf springs in the vertical direction. As the leaf springs decrease in length gradually from the bottom upwards in the vertical direction, the first leaf spring 11 at the lowest part should be the longest leaf spring.

According to embodiments of this application, the first leaf spring 11 is disposed at the lowest part of the leaf spring structure 1, facilitating the arrangement of two first lifting ears 111 at two first free ends of the first leaf spring 11 in the length direction and allowing the first leaf spring 11 to support from the lowest part other leaf springs and other components.

Referring to FIG. 1, according to an embodiment of this application, the second leaf spring 12 is located above the first leaf spring 11.

"Above" means a direction opposite to "below" vertically. The first leaf spring 11 is at the lowest part of the leaf spring structure 1, and other leaf springs are all located above the first leaf spring 11. For example, the second leaf spring 12 is located above the first leaf spring 11. As the leaf springs decrease in length gradually from the bottom upwards, the second leaf spring 12 is shorter than the first leaf spring 11.

According to embodiments of this application, the second leaf spring 12 being disposed above the first leaf spring 11 makes it easy to arrange two second lifting ears 121 at two second free ends of the second leaf spring 12.

Referring to FIG. 1, according to an embodiment of this application, the second leaf spring 12 and the first leaf spring 11 are adjacent to or spaced apart from each other.

"Adjacent to or spaced apart from each other" means that in the vertical direction, the second leaf spring 12 is located above the first leaf spring 11, where the two leaf springs may be adjacent to each other, with the upper end surface of the first leaf spring 11 in contact with the lower end surface of the second leaf spring 12; or they may be spaced apart, with at least one second leaf spring sandwiched between the first leaf spring 12 and the first leaf spring 11. This is not limited in this embodiment of this application.

According to this embodiment of this application, the second leaf spring 12 and the first leaf spring 11 being adjacent to or spaced apart from each other can flexibly adjust the distance between the two first free ends and two second free ends in the vertical direction, thus meeting the requirements for installation space for components such as a steering knuckle 23 and a shock absorber 21 more flexibly.

Referring to FIG. 1, the first lifting ear 111 and the first leaf spring 11 are integrally formed; and/or the second lifting ear 121 and the second leaf spring 12 are integrally formed.

"Integrally formed" means that the lifting ears are stamped, forged, or cast as an integral part of the leaf spring, which can improve the strength of the lifting ears and make them less likely to break. It can be understood that the first lifting ears 111 are stamped or forged as an integral part of the first leaf spring 11, and the second lifting ears 121 are stamped or forged as an integral part of the second leaf spring 12. "Integrally formed" performs better than being assembled in compressive strength. In addition, the first leaf spring 11 and the second leaf spring 12 being "integrally formed" spares the need of any additional connecting components, and thus the steering knuckle 23 can be directly connected to the first leaf spring through the first lifting ears 111; and the shock absorber 21 can be directly connected to the second leaf spring 12 through the second lifting ears 121.

According to embodiments of this application, the lifting ears and the leaf spring being integrally formed can simplify the manufacturing process of the leaf spring structure 1 and reduce the components of the leaf spring structure 1, thus reducing the manufacturing costs of the leaf spring structure 1.

Referring to FIG. 1, the first lifting ear 111 and the second lifting ear 121 are circularly or elliptically curved.

"Circularly or elliptically curved" can create an accommodating space for connection of components such as the steering knuckle 23 and the shock absorber 21. For example, the first lifting ear 111 and the second lifting ear 121 are circularly or elliptically curved in shape. The accommodating spaces formed by the circular or elliptical curves have some degree of freedom and can serve as action ends connecting components such as the steering knuckle 23 and the shock absorber 21, that is, the first free end and the second free end.

According to embodiments of this application, the circularly or elliptically curved lifting ear does not limit the freedom degree of the two ends of the leaf spring, thus allowing for the formation of free ends connecting other components. The free ends are connected to the steering knuckle 23 and shock absorber 21 through hinging or other rotatable manners.

Referring to FIG. 1, the two second lifting ears 121 are located between the two first lifting ears 111 in the length direction.

According to embodiments of this application, the two second lifting ears 121 being located between the first lifting ears 111 can stagger the first lifting ears 111 and the second lifting ears 121 in position. This avoids mutual interference between connecting components during mounting and facilitates the mounting of the steering knuckle 23, shock absorber 21, or other components.

According to a second aspect of this application, referring to FIG. 2, an embodiment of this application discloses a suspension structure 2. The suspension structure 2 includes the aforementioned leaf spring structure 1.

The suspension structure 2 is a general term for all force-transferring connecting means between the frame (or body) and the wheels of a vehicle and configured to transmit forces and torques between the frame and the wheels and to buffer impact loads transmitted to the frame (or body) by the uneven road surface, attenuating vehicle body vibrations caused by impacts from the road surface, thus ensuring that the vehicle can drive smoothly. Conventional suspension structures 2 may be formed by elastic elements, guiding mechanisms, shock absorbers 21, and the like, and some also include buffer blocks, lateral stabilizer bars, and the like. Generally, the elastic elements are springs, leaf springs, or the like; and the guiding mechanism is a steering knuckle 23 or the like. The guiding mechanism transmits forces and torques and plays a guiding role, and can control the trajectory of the wheels in the driving process of the vehicle. In addition, the elastic elements of the suspension structure 2 may be formed by one or more groups of leaf spring structures 1. The quantity of leaf spring structures can be selected according to the requirement for connection strength of the suspension structure 2.

According to embodiments of this application, the suspension structure 2 not only has high strength, good durability, and longer fatigue life but also facilitates full use of the installation space of the vehicle. The suspension structure 2 of this application can also improve the comfort and stability of a vehicle when practically used in the vehicle.

Referring to FIG. 2, according to an embodiment of this application, the suspension structure 2 includes a steering knuckle assembly and a shock absorber assembly. The first lifting ears 111 are connected to the steering knuckle assembly, and the second lifting ears 121 are connected to the shock absorber assembly.

The steering knuckle assembly is an assembly of parts such as steering knuckles 23, lower swing arm installing brackets, and wheel hubs. Arranged symmetrically on the left and right, the steering knuckles 23 serve as the guiding mechanism in the suspension structure 2. They are hinges for the steering of wheels, configured to transmit force and torque while also providing guidance. The steering knuckle 23 has high mechanical strength and fatigue durability. When the vehicle drives, the steering knuckle 23 can bear wheel load and road impact as well as random loads such as steering and braking, ensuring that the vehicle can drive safely and steer flexibly. In addition, the steering knuckle 23 is typically fork-shaped, with two coaxial holes for installing the main pin in the upper and lower forks and a steering knuckle trunnion configured for installing the wheels. The steering knuckle 23 supports and drives the wheels to turn around the main pin so as to steer the vehicle. Considering the lightweight design of the steering, the lower end of the steering knuckle 23 can be connected to the first lifting ears 111 in the leaf spring structure 1 so as to reduce the vertical dimension of the steering knuckle 23, reducing the weight of the steering knuckle 23. The upper end of the steering knuckle 23 is connected to an upper swing arm 21 so as to bear a torsional joint torque, which is conducive to the free steering of the wheels. Both the steering knuckles 23 and the upper swing arms 21 are symmetrically arranged in the suspension structure 1 on the left and right.

The shock absorber assembly is formed by parts such as shock absorbers 21, lower spring pads, dust-proof sleeves, springs, shock absorber pads, upper spring pads, spring seats, bearings, top rubbers, and nuts. The shock absorbers 21, an important component of the suspension structure 2, are arranged symmetrically on the left and right and installed in parallel with the elastic elements to share the functionality of buffering impact and absorbing vibration. The shock absorber 21 is mainly configured to suppress the shock caused by the spring absorbing a vibration and bouncing back and the impact from the road surface, to counteract the torsional vibration of the crankshaft. In terms of the damping producing material, shock absorbers 21 are mainly classified into hydraulic type and pneumatic type. Another type of shock absorber 21 has variable damping. In terms of structure, shock absorbers 21 may be classified into single-cylinder type and double-cylinder type, and may be further classified into single-cylinder pneumatic shock absorber, double-cylinder oil-pressure shock absorber, and double-cylinder oil-pneumatic shock absorber. For example, in order to better moderate the vibration caused by impact experienced by the elastic elements, the shock absorber 21 can be connected to the second lifting ears 121 of the leaf spring structure 1, so the force experienced by the shock absorber can act directly on the bouncing center of the wheels and the bias torque of the shock absorber 21 can be avoided.

According to embodiments of this application, the suspension structure 2 further includes a steering knuckle assembly and a shock absorber assembly. The connection of the steering knuckle assembly to the first lifting ears 111 reduces the components connected to the steering knuckle 23, facilitating the steering of wheels. With the shock absorber assembly connected to the second lifting ears 121, the force experienced by the shock absorber 21 can act directly on the bouncing center of the wheels, making the force evenly distributed on the shock absorber 21, improving the shock absorbing effect. In addition, the shock absorber 21 does not have to bear the bias torque any more and therefore has less wear, increasing the service life of the shock absorber 21.

Although this application has been described with reference to some embodiments, various modifications to this application and replacements of the components therein with equivalents can be made without departing from the scope of this application. In particular, as long as there is no structural conflict, the various technical features mentioned in the embodiments can be combined in any manners. This application is not limited to the specific embodiments disclosed in this specification but includes all technical solutions falling within the scope of the claims.

What is claimed is:

1. A suspension structure, comprising:
   a leaf spring structure comprising:
      at least two leaf springs, wherein:
         the at least two leaf springs overlap in a vertical direction;
         the at least two leaf springs decrease in length gradually from bottom up; and
         the at least two leaf springs comprise a first leaf spring and a second leaf spring, the first leaf spring being longer than the second leaf spring;
      a leaf spring connecting component configured to fixedly connect body portions of the at least two leaf springs in a length direction;
      two first lifting ears respectively disposed at two first free ends of the first leaf spring in the length direction; and
      two second lifting ears respectively disposed at two second free ends of the second leaf spring in the length direction;
   a steering knuckle assembly directly connected to the first lifting ears; and
   a shock absorber assembly directly connected to the second lifting ears.

2. The suspension structure according to claim 1, wherein the at least two leaf springs have equal width.

3. The suspension structure according to claim 1, wherein the first leaf spring is disposed at a lowest part of the leaf spring structure.

4. The suspension structure according to claim 3, wherein the second leaf spring is disposed above the first leaf spring.

5. The suspension structure according to claim 1, wherein the second leaf spring and the first leaf spring are adjacent to each other.

6. The suspension structure according to claim 1, wherein the second leaf spring and the first leaf spring are spaced apart from each other.

7. The suspension structure according to claim 1, wherein:
   the first lifting ear and the first leaf spring are integrally formed; and/or the second lifting ear and the second leaf spring are integrally formed.

8. The suspension structure according to claim 1, wherein the first lifting ear and the second lifting ear are circularly or elliptically curved.

9. The suspension structure according to claim 1, wherein in the length direction, the two second lifting ears are located between the two first lifting ears.

\* \* \* \* \*